(12) United States Patent
Liu et al.

(10) Patent No.: US 7,154,449 B2
(45) Date of Patent: Dec. 26, 2006

(54) ANTENNA

(75) Inventors: Jay Zheyi Liu, Singapore (SG); Say Kin Chung, Singapore (SG); Zhiming Zhuang, Singapore (SG); Alice Lee Eng Seah, Singapore (SG)

(73) Assignee: CET Technologies Pte Ltd., Singapore (SG)

(*) Notice: Subject to any disclaimer, the term of this patent is extended or adjusted under 35 U.S.C. 154(b) by 0 days.

(21) Appl. No.: 10/512,428

(22) PCT Filed: Apr. 25, 2002

(86) PCT No.: PCT/SG02/00070

§ 371 (c)(1),
(2), (4) Date: Oct. 25, 2004

(87) PCT Pub. No.: WO03/096478

PCT Pub. Date: Nov. 20, 2003

(65) Prior Publication Data

US 2005/0179604 A1    Aug. 18, 2005

(51) Int. Cl.
*H01Q 21/00*   (2006.01)
*G08B 13/14*   (2006.01)

(52) U.S. Cl. .................. 343/867; 343/742; 340/572.1
(58) Field of Classification Search ............. 343/741, 343/742, 867, 895; 340/10.2, 572.5, 570, 340/572.1
See application file for complete search history.

(56) References Cited

U.S. PATENT DOCUMENTS

| | | | |
|---|---|---|---|
| 4,739,269 A | 4/1988 | Kopp | |
| 4,859,991 A | 8/1989 | Watkins et al. | |
| 5,142,292 A * | 8/1992 | Chang | 343/742 |
| 5,442,368 A * | 8/1995 | Harada et al. | 343/713 |
| 5,608,417 A * | 3/1997 | de Vall | 343/895 |
| 5,691,731 A | 11/1997 | van Erven | |
| 5,945,958 A * | 8/1999 | Staufer et al. | 343/728 |
| 6,285,342 B1 * | 9/2001 | Brady et al. | 343/895 |
| 6,353,420 B1 * | 3/2002 | Chung | 343/895 |
| 6,380,845 B1 * | 4/2002 | Tuttle | 340/10.4 |
| 6,584,301 B1 * | 6/2003 | Bohn et al. | 340/10.1 |
| 6,992,630 B1 * | 1/2006 | Parsche | 343/700 MS |

FOREIGN PATENT DOCUMENTS

| | | |
|---|---|---|
| GB | 2315602 | 2/1998 |
| JP | 11-136017 | 5/1999 |
| JP | 2000-036019 | 2/2000 |
| JP | 2000/286630 A | 10/2000 |

* cited by examiner

*Primary Examiner*—Tan Ho
(74) *Attorney, Agent, or Firm*—Sughrue Mion, PLLC

(57) ABSTRACT

An antenna suitable for use in a Radio Frequency Identification (RFID) tag is disclosed. The antenna includes a plurality of discrete loop antennas (130, 140, 150) disposed concentrically on a substrate. Each one of said plurality of loop antennas is electrically isolated from each other one of said plurality of loop antennas.

12 Claims, 3 Drawing Sheets

ANTENNA

This application is a 371 of PCT/SG02/00070 filed on Apr. 25, 2002.

BACKGROUND OF THE INVENTION

The present invention relates to an antenna, and more particularly to an improved antenna for use with radio frequency identification (RFID) tags. Such tags can be used in many applications including tracking goods in transit or within a production facility, or for use in anti-pilfering systems to protect articles from shoplifting.

A problem with such tags, which are designed to be used globally, is that it is difficult to design a tag that is suitable for use in all regions of the world without a license. This is due to the differing regulation regimes operating in different countries.

It would be desirable to implement a passive wide band tag that operates on the Industrial Scientific and Medical (ISM) band for both the US (902–928 MHz) and Europe (869.40–869.65MHz). Different regulations govern the performance of devices operating in the ISM band in different countries. In the USA, a maximum transmit power of 4W (EIRP—Equivalent Isotropically Radiated Power) is allowed, and in Europe, a maximum transmit power of 0.5W (ERP—Effective Radiated Power) is allowed. The difference in the form of the maximum allowed in each region is derived from a different reference source. The USA reference is an ideal isotropic radiator, and the European reference is a dipole.

Passive tags can only radiate when interrogated as they rely on received power to generate a transmission. Active tags, however, can potentially radiate at all times and thus may interfere with other devices in their vicinity.

In order to operate on both bands for the USA and Europe, it is desirable to have a wide band antenna with relatively high gain and small size.

DESCRIPTION OF THE PRIOR ART

Types of antenna that can be used include microstrip, dipole and loop antennas. A disadvantage of the microstrip antenna is the relatively large size required for performance at a frequency of around 900 MHz. Thin profile microstrips have narrow bandwidth and poor radiation efficiency with a lossy substrate. Therefore, planar patch antennas are not a good choice for a low cost solution. Dipole and loop antennas have similar behavior and their conductors can be supported on a lossy substrate without sacrificing their gain performance. Loop antennas operate well in magnetic near field coupling, or electric far field propagation.

SUMMARY OF THE PRESENT INVENTION

In a first broad form the present invention provides an antenna for use in a Radio Frequency Identification (RFID) tag, including a plurality of discrete loop antennas disposed concentrically on a substrate, each one of said plurality of loop antennas being electrically isolated from each other one of said plurality of loop antennas.

Multi loop designs can increase the band width of the antenna significantly, without enlarging the size of the antenna by a substantial amount. Generally, adopting a concentric layout for a multi loop antenna ensures that it occupies the same size as that of the outer loop antenna alone.

Embodiments of the present invention provide an antenna for use in a tag having a wide band (868–928 MHz) small size, low profile, low cost and relatively high gain. Tags using antennas according to embodiments of the invention, can achieve an operating range of about 3 meters, for the entire band at power of 1 to 2 watts ERP.

Embodiments of the present invention may also find uses in active tag and semi active tag technology, both of which may be partly powered at least by batteries. Furthermore, the technology may also be employed in other fields such as RF signal detectors.

Preferably, the loop antennas are configured to be generally rectangular in shape.

In an alternative embodiment, the surface area occupied by the antenna may be reduced by configuring the loop antennas as meander loop antennas.

The loop antennas may advantageously be disposed on a Printed Circuit Board (PCB). The individual loop antennas may be disposed on one or more layers of the PCB.

Preferably, the antenna includes a closed outer loop antenna, a closed inner loop antenna, and an open feed loop antenna extending between a pair of feed terminals, said feed loop antenna being disposed between said outer and inner loop antennas.

BRIEF DESCRIPTION OF THE DRAWINGS

For a better understanding of the present invention and to understand how the same may be brought into effect, the invention will now be described by way of example only, with reference to the appended drawings in which.

DETAILED DESCRIPTION OF THE PREFERRED EMBODIMENTS

Figure 1:
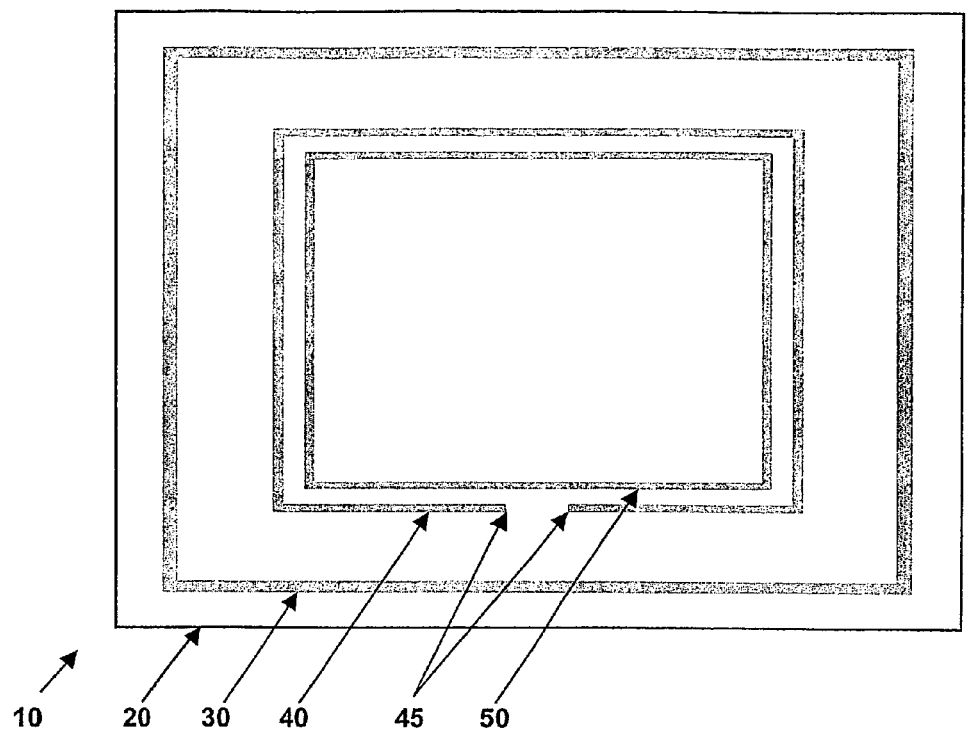
FIG. 1 shows a plan view of a tri-loop wide band antenna with rectangular configuration, according to an embodiment of the invention.

FIG. 1 shows a multi loop antenna 10 according to an embodiment of the invention. The antenna 10 is illustrated in a form suitable for use with an RFID tag. The antenna 10 includes a substrate 20 on which is disposed three generally concentric antenna loops 30, 40, 50.

The space inside central antenna loop 50 may be used to accommodate any associated electronic circuitry, helping to minimize the overall area occupied by the tag.

The outer loop 30 and inner parasitic loop 50 are closed loops. The central loop 40 functions as a feed loop, and has a pair of feed terminals 45.

The resonant frequency of the antenna 10 is determined by a combination of factors, each in some way determined by the physical characteristics of each antenna loop 30, 40, 50. The outer loop 30, with its longer loop-length resonates at a frequency falling within the lower portion of the antenna band of operation. This loop 30 has a dominant effect on the antenna characteristics due to its larger aperture size.

The feed loop 40 with its parasitic element 50 resonates at a higher frequency due to its shorter loop length, and acts to extend the upper portion of the antenna's band of operation.

Parasitic loop 50 has the effect of altering the impedance of the feed loop 40. It can also have an effect on the resonant frequency of the feed loop 40, which tends to decrease as the space between the two loops is decreased. The impact on outer loop 30 from inner loop 50 is not significant provided that the spacing between the two loops is greater than 0.05λ.

In practice, the design of an antenna having a particular response is an iterative process, requiring adjustments to the configuration of each antenna loop forming the antenna 10 and assessing the impact of each change on the overall performance of the antenna 10.

The iterative process involves both manual and computer steps to assess the impact of a particular design change on the antenna's characteristics. Such iterative steps are performed at a pre-manufacture simulation stage, and also once a prototype antenna has been fabricated.

The terminal impedance of the tri-loop antenna 10 is determined not only by the feed loop 40, but also by configuration (width, length, spacing) of the parasitic loop 50. The width and length of the outer loop 30 will also have some influence on the terminal impedance, but its effect will generally not be so pronounced as that of the parasitic loop.

The impedance matching of the antenna to the connected circuitry can be improved by adjusting the widths and circumferences of the individual loops, and this process is best performed as part of the iterative process referred to previously.

The impedance will change from being inductive to capacitive by increasing the length of the outer loop 30. The same effect is achieved by decreasing the length of the feed loop 40 and its parasitic element 50. Resonant resistance decreases with an increase in the width of the outer loop 30, but increases with an increase in the width of the inner loop 50. In general, loop lengths mainly affect the reactive component of the terminal impedance, and the width of the loops mainly affect the real component of the terminal impedance.

The iterative process described above can allow alterations in the physical characteristics of the antenna loops to be made to maximize impedance matching over the desired frequency band.

The term 'loop' is intended herein to include any generally closed shape and specifically includes circles, squares, rectangles and other similar polygonal shapes. The term 'loop' additionally herein includes any irregular shape which is generally closed and encloses a given area.

The selection of shape used for any particular antenna is governed primarily by the aperture size required for the antenna. The gain of the antenna is largely determined by its aperture size, and as such, there is usually a compromise to be made between the desired antenna gain and the physical size of the antenna.

Generally, opting for a concentric arrangement for the antenna loops is the preferred choice, as the central loop 40 and its parasitic loop 50 do not increase the overall size of the antenna.

Figure 2:
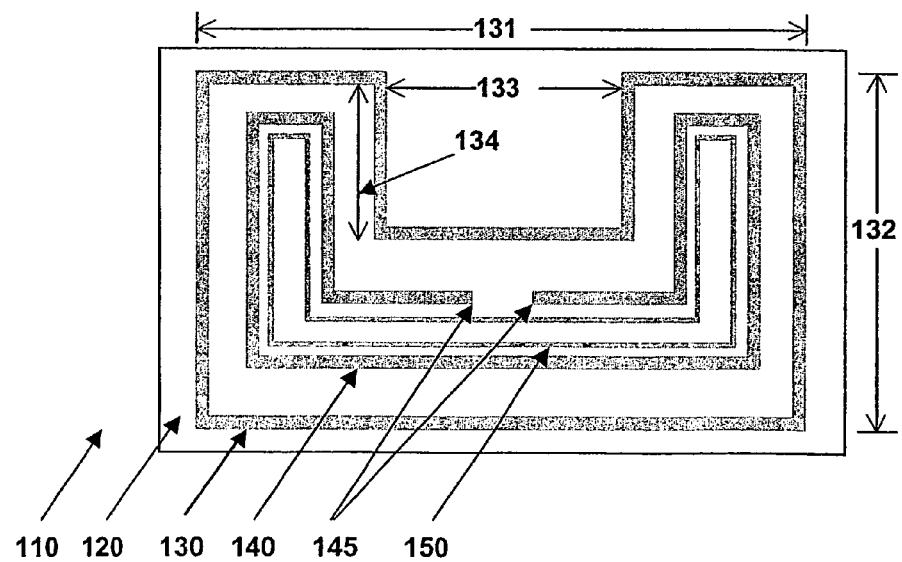
FIG. 2 shows a meander multi loop antenna having a smaller size compared to that of FIG. 1.

To further reduce the overall size of the antenna, it is possible to adopt a so-called meander loop design for the individual antenna loops. This type of configuration is illustrated in FIG. 2. The term 'meander loop' means that at one or more points around the circumference of the loop, the path followed by the loop deviates to produce an irregular shape. Such an antenna has the advantage of occupying a smaller area than a regularly configured antenna, but has a lower gain due its smaller aperture.

The antenna 110 of FIG. 2 is disposed on a substrate 120, such as a Printed Circuit Board (PCB). It includes three individual meander loops 130, 140, 150. The three loops are arranged in a concentric manner as previously described in relation to the antenna of FIG. 1. In this case, the outer loop 130 is arranged to have a generally U-shaped, and the feed loop 140 and inner loop 150 are similarly configured.

The shapes of the individual loops do not need to be identical. In practice the shapes of the inner 150 and central 140 loops tend to be identical or nearly so as they are placed closer together. The shape chosen for the outer loop 130 can vary to a greater extent while still achieving the required performance.

If the individual loops are disposed on different layers of the substrate, then it is possible for the loops to overlap to some extent. In particular, the outer loop 130 may be configured to partially overlay the central 140 and/or inner 150 loop if it is arranged on a first layer of the substrate and the central and inner loops are arranged on a second layer of the substrate.

Each side of each meander loop 130, 140, 150 is arranged to be parallel with the similar side of the other meander loops. In this way, each loop is similarly shaped and is substantially concentric with the other loops forming the antenna 110.

Figure 3:
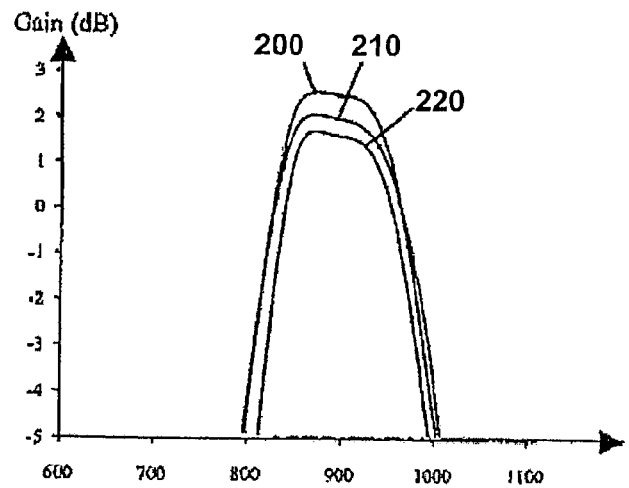
FIG. 3 is graph illustrating the effect of the area encircled by the outer loop conductor on the antenna gain.

FIG. 3 illustrates the effect of aperture size (which is dependent on the area enclosed by the outer loop of the antenna) on gain. Curve 200 corresponds to the case where the antenna has an arrangement of regularly shaped loops such as that illustrated in FIG. 1.

Curve 210 and 220 correspond to two particular cases where the antenna has an arrangement of irregularly shaped loops such as that illustrated in FIG. 2.

The table below shows the different dimensions for antennas generally of the configuration shown in FIG. 2 which produced curves 210 and 220. In the table, the dimensions are shown in mm, and although FIG. 2 only shows the references for the outer loop 130, it will be appreciated that similar references for the other loops 140, 150 refer to similar features of those antenna loops. The figure given in the WIDTH column refers to the width in mm of the trace on the PCB which makes up the loop antenna.

| Outer Loop Antenna 130 | | | | | |
|---|---|---|---|---|---|
| ANTENNA | 131 | 132 | 133 | 134 | WIDTH |
| 1 | 82 | 66 | 5.9 | 24.5 | 3 |
| 2 | 78.1 | 50.1 | 26.9 | 19.8 | 1.9 |

| Feed Loop Antenna 140 | | | | | |
|---|---|---|---|---|---|
| ANTENNA | 141 | 142 | 143 | 144 | WIDTH |
| 1 | 55.9 | 39.5 | 14 | 23.5 | 1.6 |
| 2 | 59.2 | 29.2 | 21.5 | 21 | 2.3 |

| Inner Loop Antenna 150 | | | | | |
|---|---|---|---|---|---|
| ANTENNA | 151 | 152 | 153 | 154 | WIDTH |
| 1 | 48 | 31.6 | 37.9 | 23.5 | 2.12 |
| 2 | 53.6 | 23.6 | 50.6 | 21 | 0.5 |

Figure 4:
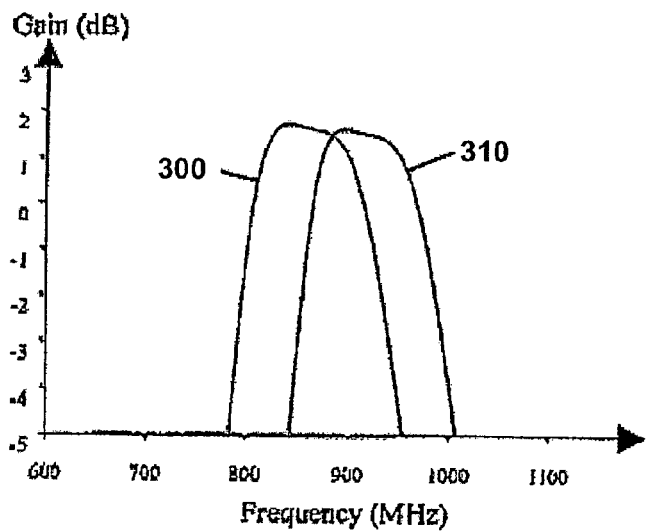
FIG. 4 is a graph illustrating the variation in frequency and gain characteristics with different loop links.

FIG. 4 shows a graph of frequency variation with loop length. Curve 310 shows gain versus frequency for a meander loop antenna with shorter loop length and, thus, higher resonant frequency. When the loop lengths are increased proportionally, the resonant frequency decreases as shown by curve 300. Note also that the antenna gain increases slightly in the case of curve 300. This is because the surface area and hence the aperture of the antenna increases with longer loop length.

Figure 5:
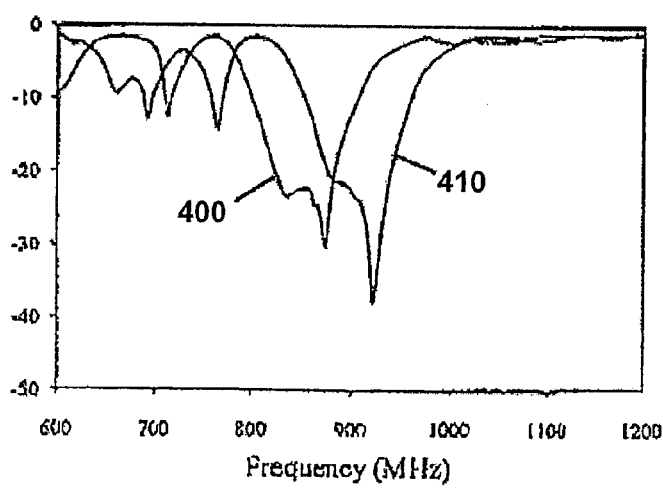
FIG. 5 is a graph illustrating the variation in return loss with different frequencies.

FIG. 5 shows a graph of return loss ($S_{11}$) versus frequency, for the two antennas described in the above tables. Curve 410 corresponds to the case with a shorter loop length, and curve 400 corresponds to the case with a longer loop length.

Figure 6:
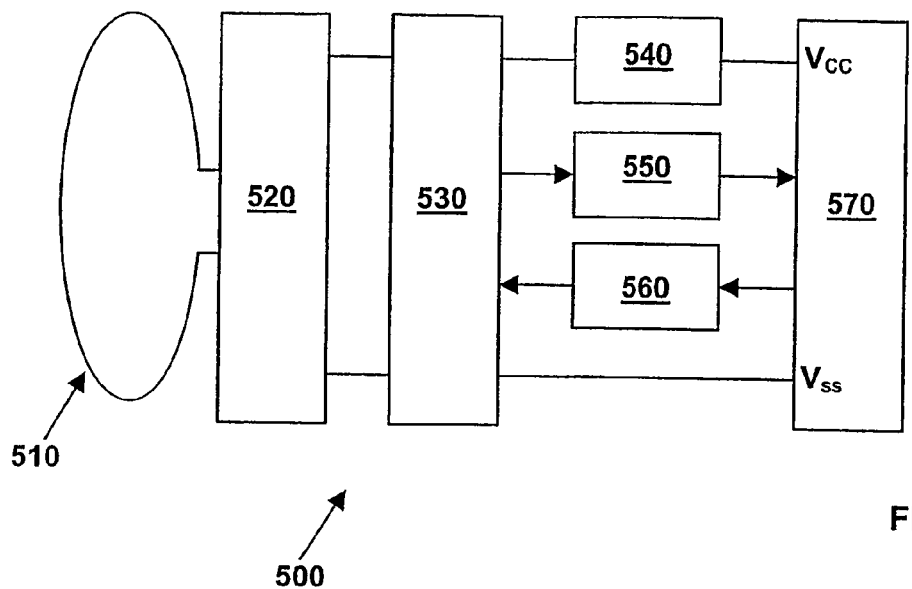
FIG. 6 is a diagram showing the configuration of a passive tag circuit.

Antennas according to embodiments of the invention are particularly suitable for use in RFID tags and FIG. 6 illustrates how such an antenna may be incorporated into such a tag.

FIG. 6 shows the circuit configuration of a passive tag 500. The tag 500 includes a multi-loop antenna 510 as previously described. The antenna 510 is connected to a first port of a matching circuit 520 so that the impedance of the antenna can be matched to that of the Radio Frequency (RF) circuitry-connected to a second port of the matching circuit 520. The matching circuit is then connected to a rectification circuit 530. The rectification circuit 530 amplifies and demodulates received signals from the antenna 510, and then passes the signals on to a pulse shaping circuit 550 and the processor (MCU) 570 for processing. The rectified signal from rectification circuit 530 is converted to a DC voltage via voltage regulator 540. The output from the voltage regulator 540 is used to provide power for the MCU 570.

The interrogator which seeks to determine the presence of a conforming tag transmits data which is modulated onto a carrier wave. After it has completed transmission of the data, it continues transmitting an unmodulated carrier wave signal. This signal is then used by the passive tag to generate its own carrier onto which is modulated the response data.

When operating to transmit data, the MCU 570 generates data and passes it on to modulator 560 to control a switching circuit that provides a switching function for rectification circuit 530 so that the incoming carrier signal is modulated according to the switching function. The modulated carrier is backscattered to the interrogator via matching circuit 520 and antenna 510. The switching modulation process and backscattering occur simultaneously.

The passive tag 500 illustrated in FIG. 6 is entirely powered by the received RF energy which is rectified and regulated as described. The tag 500 may be constructed on a PCB, the dimensions of which are determined by the size of the antenna 510 required. The circuitry may be disposed within the area defined by one of the loops of the multi loop antenna. In the case of a meander loop antenna, the circuitry may be disposed within the open part of the U-shaped outer loop 130 as shown in FIG. 2.

The loops of the antenna may be disposed on different layers of the PCB, or on the same layer. Since the coupling between the loops is entirely non-conductive coupling, i.e. reactive coupling, each loop may be positioned on a different layer. In any case, the material from which the PCB is constructed may have an effect on the antenna's characteristics, and allowance should be made for this.

Figure 7:
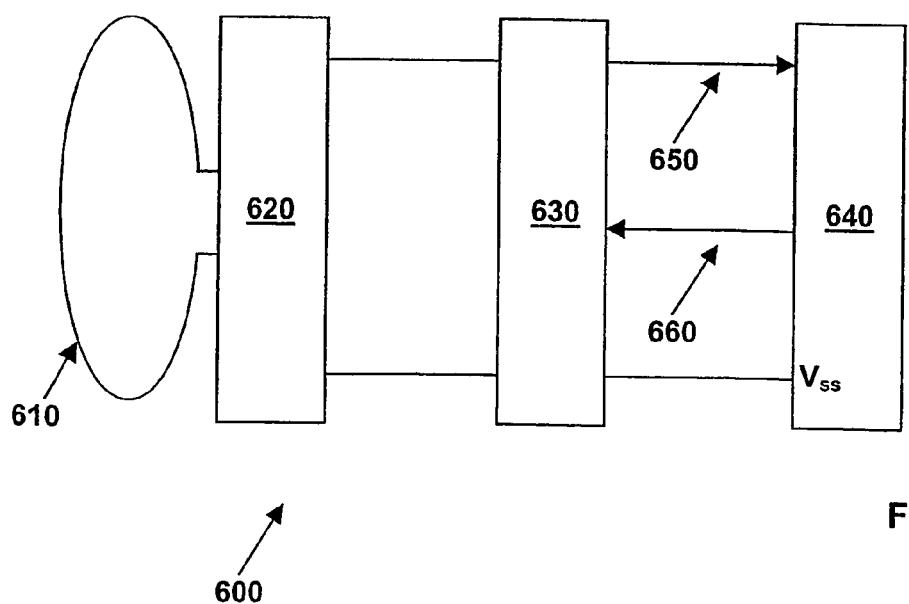
FIG. 7 is a diagram showing the configuration of an active tag circuit.

FIG. 7 shows how an antenna according to embodiments of the invention may be used with an active tag 600. The active tag 600 has an antenna 610 which may be identical to the antenna 510 used in the passive tag 500. The antenna 610 is connected via a matching circuit 620 to a transceiver 630. The transceiver includes a peak detector, a low noise amplifier (LNA) and a pulse shaper circuit in its receiver branch, and an oscillator and modulator in its transmitter branch.

When receiving data via antenna 610, the transceiver produces an output data stream 650 for passing to MCU 640. In response, the MCU 640 responds according to the data received by producing data stream 660. This data 660 is passed to transceiver 630 for transmission via antenna 610, and receipt by the remote interrogating device.

In contrast to the passive tag described previously, an interrogator which is configured to be used with active tags does not continue transmitting a carrier wave signal after transmitting its interrogation data. The active tag is able to actively generate all the necessary signals itself.

Both passive 500 and active 600 tags may be constructed on a simple PCB and then encapsulated in a material which prevents the tags being tampered with. This is useful when the tags are used in a security application such as an anti-pilfer device.

In the light of the foregoing description, it will be clear to the skilled man that various modifications may be made within the scope of the invention.

The present invention includes and novel feature or combination of features disclosed herein either explicitly or any generalization thereof irrespective of whether or not it relates to the claimed invention or mitigates any or all of the problems addressed.

The invention claimed is:

1. An antenna for use in a Radio Frequency Identification (RFID) tag, including a plurality of discrete loop antennas disposed concentrically on a substrate, each one of said plurality of loop antennas being electrically isolated from each other one of said plurality of loop antennas.

2. An antenna as claimed in claim 1 wherein the loop antennas are generally rectangular in shape.

3. An antenna as claimed in claim 1 wherein the loop antennas are meander loop antennas.

4. An antenna as claimed in claim 1 wherein the substrate is a printed circuit board (PCB).

5. An antenna as claimed in claim 1 further including electronic circuity disposed on the substrate within an area defined by the antenna.

6. An antenna for use in a Radio Frequency Identification (RFID) tag, including a plurality of discrete loop antennas disposed concentrically on a substrate, each one of said plurality of loop antennas being electrically isolated from each other one of said plurality of loop antennas,
   wherein ones of the plurality of loop antennas are disposed on different layers of the substrate.

7. An antenna for use in a Radio Frequency Identification (RFID) tag, including a plurality of discrete loop antennas disposed concentrically on a substrate, each one of said plurality of loop antennas being electrically isolated from each other one of said plurality of loop antennas,
   wherein the antenna includes:
   a closed outer loop antenna
   a closed inner loop antenna; and an open feed loop antenna extending between a pair of feed terminals, said feed loop antenna being disposed between said outer and inner loop antennas.

8. A Radio Frequency Identification (RFID) tag comprising
an antenna having a plurality of discrete loop antennas disposed concentrically on a substrate, each one of said plurality of loop antennas being electrically isolated from each other one of said plurality of loop antennas.

9. A Radio Frequency Identification (RFID) tag comprising an antenna having a plurality of discrete loop antennas disposed concentrically on a substrate, each one of said plurality of loop antennas being electrically isolated from each other one of said plurality of loop antennas,
wherein the tag is an active tag, and further includes a battery.

10. A Radio Frequency Identification (RFID) tag comprising an antenna having a plurality of discrete loop antennas disposed concentrically on a substrate, each one of said plurality of loop antennas being electrically isolated from each other one of said plurality of loop antennas,
wherein the antenna includes:
a closed outer loop antenna
a closed inner loop antenna; and
an open feed loop antenna extending between a pair of feed terminals, said feed loop antenna being disposed between said outer and inner loop antennas.

11. An antenna for use in a Radio Frequency Identification (RFID) tag, including a plurality of discrete loop antennas disposed concentrically on a substrate, each one of said plurality of loop antennas being electrically isolated from each other one of said plurality of loop antennas,
wherein the widths of the traces defining at least two loops are different from each other.

12. A Radio Frequency Identification (RFID) tag comprising an antenna having a plurality of discrete loop antennas disposed concentrically on a substrate, each one of said plurality of loop antennas being electrically isolated from each other one of said plurality of loop antennas,
wherein the widths of the traces defining at least two loops are different from each other.

* * * * *